United States Patent
Sliger et al.

(10) Patent No.: US 6,449,764 B1
(45) Date of Patent: Sep. 10, 2002

(54) FILE UPDATE BY PRE-INITIALIZING COMPRESSOR/DECOMPRESSOR WITH OTHER THAN DECOMPRESSION AID DATA

(75) Inventors: Michael V. Sliger, Issaquah; Thomas D. McGuire, Woodinville; Jonathan A. Forbes, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,461

(22) Filed: Apr. 28, 2000

Related U.S. Application Data

(62) Division of application No. 09/093,591, filed on Jun. 8, 1998, now Pat. No. 6,216,175.

(51) Int. Cl.[7] .......................... G06F 9/445; G06F 7/00
(52) U.S. Cl. ................ 717/170; 717/171; 707/101; 710/2; 341/51
(58) Field of Search .................. 707/101, 202, 707/203, 511; 710/1, 2; 708/203; 341/51; 717/106, 168–171

(56) References Cited

U.S. PATENT DOCUMENTS

| | | |
|---|---|---|
| 5,150,430 A | 9/1992 | Chu |
| 5,455,577 A | 10/1995 | Slivka et al. |
| 5,499,357 A | 3/1996 | Sonty et al. |
| 5,521,597 A | 5/1996 | Dimitri |
| 5,537,489 A | 7/1996 | Sinden et al. |
| 5,563,595 A | 10/1996 | Strohacker |
| 5,572,206 A | 11/1996 | Miller et al. |
| 5,574,906 A * | 11/1996 | Morris ........................ 707/1 |
| 5,600,834 A | 2/1997 | Howard |
| 5,608,396 A | 3/1997 | Cheng et al. |
| 5,652,878 A | 7/1997 | Craft |
| 5,706,510 A * | 1/1998 | Burgoon .................. 707/203 |

(List continued on next page.)

FOREIGN PATENT DOCUMENTS

EP 462 363 A2 12/1991

OTHER PUBLICATIONS

Peter Moulder, "ext2fs Compression Patches," May 18, 1997, one page; <URL> <http://www.linuxhq.com/patch/20–p0495.html>.*

"Compression of Updated Data by Extraction of Differences," IBM Technical Disclosure Bulletin, vol. 33, Issue 6B, pp. 58–60, Nov. 1, 1990.*

(List continued on next page.)

Primary Examiner—Tuan Q. Dam
(74) Attorney, Agent, or Firm—Klarquist Sparkman, LLP

(57) ABSTRACT

Rather than comparing an old file with a new file to generate a set of patching instructions, and then compressing the patching instructions to generate a compact patch file for transmission to a user, a patch file is generated in a single operation. A compressor is pre-initialized in accordance with the old version of the file (e.g. in an LZ77 compressor, the history window is pre-loaded with the file), or other reference file available on the user's computer for purpose other than serving as a decompression aid. The pre-initialized compressor then compresses the old file, producing a patch file from which the new file can be generated. At the user's computer, a parallel process is performed, with the user's copy of the old file being used to pre-initialize a decompressor to which the patch file is then input. The output of the decompressor is the new file. The patch files generated and used in these processes are of significantly reduced size when compared to the prior art.

7 Claims, 4 Drawing Sheets

U.S. PATENT DOCUMENTS

| | | | | |
|---|---|---|---|---|
| 5,724,581 A | * | 3/1998 | Kozakura | 707/202 |
| 5,813,017 A | * | 9/1998 | Morris | 707/204 |
| 5,832,520 A | * | 11/1998 | Miller | 707/203 |
| 5,835,778 A | * | 11/1998 | Yoshihara | 717/11 |
| 5,838,963 A | | 11/1998 | Griffiths | |
| 5,857,187 A | | 1/1999 | Uenoyama et al. | |
| 5,857,205 A | | 1/1999 | Roth | |
| 5,924,096 A | * | 7/1999 | Draper et al. | 707/10 |
| 5,956,724 A | | 9/1999 | Griffiths | |
| 5,956,733 A | | 9/1999 | Nakano et al. | |
| 5,978,795 A | | 11/1999 | Poutanen et al. | |
| 6,216,175 B1 | * | 4/2001 | Sliger et al. | 710/1 |
| 6,243,766 B1 | * | 6/2001 | Sliger et al. | 710/2 |

OTHER PUBLICATIONS

Tichy, "The String–to–String Correction Problem with Block Moves," *ACM Transactions on Computer Systems*, vol. 2, No. 4, pp. 309–321 (Nov. 1984).

Hunt et al., "Delta Algorithms: An Empirical Analysis," prior to Jun. 1998.

Hunt et al., "An Empirical Study of Delta Algorithms," prior to Jun. 1998.

MacDonald, "The Design and Implementation of Distributed, Disconnected Operation in PCRS," prior to Jun. 1998.

Reuter et al., "Distributed Revision Control Via the World Wide Web," prior to Jun. 1998.

Hunt et al., "Distributed Configuration Management via Java and World Wide Web," prior to Jun. 1998.

Hunt et al., "Selected Patterns for Software Configuration Management," prior to Jun. 1998.

Hunt et al., "Compression Comparison: RCE (bdiff) vs. RCS (diff), " Feb. 16, 1998.

IBM Tech. Discl. Bull., vol. 39, No. 3, pp. 339–340, Mar. 1996.

IBM Tech. Discl. Bull., vol. 37, No. 4B, pp. 325–328, Apr. 1994.

IBM Tech. Discl. Bull., vol. 36, No. 11, pp. 587–588, Nov. 1993.

Murtha, A.J., "The Development of a Configuration Control Tool," *Software Maintenance*, 1991, Proceddings. Conference on, 1991, pp. 265–268.

* cited by examiner

FILE UPDATE BY PRE-INITIALIZING COMPRESSOR/DECOMPRESSOR WITH OTHER THAN DECOMPRESSION AID DATA

This application is a divisional of U.S. patent application Ser. No. 09/093,591, filed Jun. 8, 1998, now U.S. Pat. No. 6,216,175 B1.

FIELD OF THE INVENTION

The present invention relates to the updating of computer software by use of patch files, the generation of such patch files, and the normalization of files to which such patches are applied.

BACKGROUND AND SUMMARY OF THE INVENTION

Popular computer programs, including computer operating system software, are subject to near-constant revision. Their evolution is sometimes so rapid that, a month after installation, a newer version is available. The newer version may feature additional capabilities, bug fixes, and enhanced comparability with other programs. Accordingly, many users desire to update their programs each time a newer version is released.

A user wishing to update a computer program can either acquire a new copy of the program, or "patch" the old. Patching is growing in popularity, particularly with the growth of the internet. Patches for updating many popular computer programs are now commonly available from software vendor's web sites, allowing users to update their software programs without leaving home.

Patching is an old technology, going back decades. Generally, patch files include a series of instructions specifying how a new version of a file can be assembled from snippets of data from an old version of the file, together with insertions of new data. An exemplary series of patching instructions may look like the following:

1. Load old file ABC.EXE into memory;
2. Check that the file data at offset 16 reads "Version 2.04"; if not, fail;
3. Copy bytes 1 through 16 of the old file into a new file;
4. Next, insert the ASCII text "Version 3.02" into the new file;
5. Next, copy bytes 22–256 of the old file into the new file;
6. Next, insert the following hex data into the new file:

| 09 | 03 | 00 | 01 | 60 | 6B | F5 | D5 |
| 3B | 59 | 1A | 10 | B5 | 69 | 08 | 00 |

7. Next, copy bytes 289–496 of the old file into the new file;
8. Next, copy bytes 505–512 into the new file;
9. Close the new file and store under name ABC.EXE.

It will be recognized that the foregoing instructions result in a new version of file ABC.EXE in which:

the first 16 bytes are unchanged;
the version number stored at bytes 17–28 has been rewritten from "Version 2.04" to "Version 3.02"
bytes 22–256 are unchanged;
32 bytes of hex data at bytes 257–288 have been rewritten;
bytes 289–496 are unchanged;
bytes 497–504 have been omitted; and
bytes 505–512 have been shifted to immediately follow byte 496.

Due to the replication of long strings of data from the old file in the new file, the series of patching instructions is much shorter than the file being patched. This size economy is the reason patching is more popular than transferring an entire copy of the new file.

The process of generating patching instructions, like those reproduced above, is typically automated. The vendor inputs copies of the new and old program file to a pattern matching algorithm, which tries to locate where strings of data in the new file can be found in the old file. Where such matches are found, appropriate copy instructions are generated and added to the collection of instructions that will form the patch file. Where data in the new file has no counterpart in the old, the new data is literally specified in the patch file. When completed, the patch file—in conjunction with the old version of the file—contains all the information necessary to generate the new version of the file.

After the patching instructions have been specified in a patch file, the file is typically compressed to minimize its size and download time (assuming an internet or other network download). Many suitable compression processes are known. Various implementations of the popular LZ compression algorithms typically reduce file sizes on the order of 50%.

After the patch file is compressed, it is transferred from the vendor's computer to the user's computer—by internet in this example. On the user's computer a decompression process is first performed to restore the patching instructions to their original form. Then the various operations specified by the patching instructions are performed, transforming a copy of the user's old file into the latest version.

While the just-described process is a great improvement over transferring a new copy of the complete program file from the vendor to the user, it still suffers from certain drawbacks.

One is the size of the compressed patch file. As discussed below, patch file sizes considerably smaller than those resulting from prior art processes are possible, reducing internet download times (or reducing needed disk storage) commensurately.

Another problem is that the version of the old file on the user's computer may not precisely match the version distributed by the vendor. In particular, the file may have been tailored in certain respects—at the time of installation on the user's computer—to better conform to particular characteristics of the user's computer. Thus, for example, a program file as installed on a single-processor computer may be slightly different than the "same" program file as installed on a multi-processor computer. Unless the precise contents of the file as installed on the user's computer are known, patching is a risky business.

When a software vendor knows that there are several different versions of a file to be updated, the vendor may publish a multi-version patch file. Such a patch file can be a concatenation of several different sets of patching instructions, each one applicable to a different version of the file. The drawback of this approach is that half, or more, of the patch file is superfluous data—inapplicable to the file stored on a particular user's computer. Thus, its download time is far longer than is really necessary.

Another type of multi-version patch file has a general set of patching instructions (for code that is consistent through all versions of the old file), together one or more specialized sets of patching instructions (for code that is different between different versions of the old file). Branch instructions in the patching file examine particular characteristics of the old file, and apply the appropriate set of specialized patching instructions.

Again, this approach suffers by reason of more patching data than is needed for any given user.

In accordance with a preferred embodiment of the present invention, the foregoing and additional drawbacks of the prior art are overcome. The two distinct operations of pattern matching and compression (performed on the vendor's computer in prior art patch generation techniques) are replaced by a single operation that both compares old and new file versions, and produces a compressed output by which the latter can be generated from the former. Likewise, the two distinct operations of decompression and patch instruction application (performed on the user's computer in the prior art) are replaced by a single operation that both decompresses the patch file data and results in recreation of the new file. The patch file generated and used in these processes is of considerably reduced size—sometimes half the size of compressed patch files produced by prior art approaches.

In the preferred embodiment, these advantages are achieved by use of compression/decompression processes in which the compressor (and decompressor) is pre-initialized in accordance with the old version of the file being updated. In implementations using LZ77-type compression, this pre-initialization takes the form of preloading the respective compressor/decompressor history windows with the old version of the file. On the vendor side, the new file is applied to the pre-initialized compressor, yielding the patch file as output. The compressor both identifies redundancies between the new file and the old file (with which the compressor's history window has been preloaded), and provides a highly compressed output. On the user's side, the patch file is decompressed using a parallel process.

(LZ77 is a form of adaptive dictionary compression named after Lempel/Ziv's 1977 paper "A Universal Algorithm for Sequential Data Compression," IEEE Trans. Info. Theory, IT-23 (3), pp. 337–343. Many variants of this technology are known, including LZR (Rodeh's 1981 implementation), LZSS (Bell's 1986 implementation), LZB (Bell's 1987 implementation), LZH (Brent's 1987 implementation), etc. Further details can be found in the book *Text Compression* by Timothy Bell et al, Prentice Hall, 1990, and in Microsoft's U.S. Pat. Nos. 5,572,206, 5,521,597, and 5,455,577. A searching technique for identifying matches within the history window is disclosed in pending application Ser. No. 08/783,491, filed Jan. 14, 1997. The disclosures of these patents and patent application are incorporated by reference.)

The same technique is similarly applicable to non-LZ77 compressors. For example, in LZ78-type compressors, pre-initialization can be accomplished by first applying the old file to the compressor, thereby causing the compressor to build a string dictionary comprising excerpts of the old file. The new file is thereafter applied to the same compressor. The pre-initialization of the compressor's string dictionary allows it immediately to effect high compression efficiencies due to matches between the new file and the pre-initialized string dictionary.

(LZ78 is another form of adaptive dictionary data compression, this one named after Lempel/Ziv's 1978 paper, "Compression of Individual Sequences Via Variable-Rate Coding," IEEE Trans. Info. Theory, IT-23 (5), pp. 530–536. Many variants of this, too, are known, including LZW (Welch's variation), LZFG (Fiala and Green's variation), and UNIX Compress.)

In LZ78-type systems, the pre-initialization of the decompressor is slightly more complex than in LZ77-type systems. Rather than copying the old file directly into a history window, a string table must be formed, duplicating the string table in the compressor after pre-initialization (i.e. when the new file was applied). In the preferred embodiment, the user's computer is provided with both a decompressor and a compressor. The compressor is used to process the old file (from the user's computer) just as was done at the vendor's computer—thereby producing a string table. This string table is then used in the decompressor (effecting its "pre-initialization") for decompression of the patch file from the vendor.

The same pre-initialization approach can be applied to Markov model compressors. Again, the old file is first applied to the compressor. The compressor generates probability data statistically modeling the old data file (e.g. calculating the probability of encountering a symbol X after seeing a certain number of previous symbols). When the new file is thereafter applied to the pre-initialized compressor, the existing probability data allows immediate compression efficiencies, producing a much more compact output file. This file is transferred to the user's computer. Again, as with LZ78, the user's computer has a compressor as well as a decompressor. Again, the copy of the old file on the user's computer is applied to the compressor, thereby generating the probability data with which the decompressor is pre-initialized. The compressed file from the vendor is then applied to the pre-initialized decompressor, regenerating the complete new file on the user's computer.

The preferred embodiment also addresses variant installations of the old file on different computers, so that a single patch file can be applied irrespective of such variations. By so doing, the need for a multi-version patch file is eliminated, further reducing the size of the patch file when compared with prior art techniques.

In the illustrated embodiment, such file variations are "normalized" prior to application of the patch file. A temporary copy of the old file is desirably made, and locations within the file at which the data may be unpredictable due to idiosyncrasies of the file's installation are changed to predictable values. So doing assures that the data to which the patch file is applied will be essentially uniform across all computers.

Additional features and advantages of the present invention will be more readily apparent from the following detailed description, which proceeds with reference to the accompanying drawings.

DETAILED DESCRIPTION

To illustrate the principles of the invention, the following discussion details an exemplary embodiment employing LZ77-type compression/decompression processes. However, as noted above, the invention is not so limited, but can be applied e.g. to any compression technology in which the compressor adapts to the data to improve compression efficiency.

Figure 1:
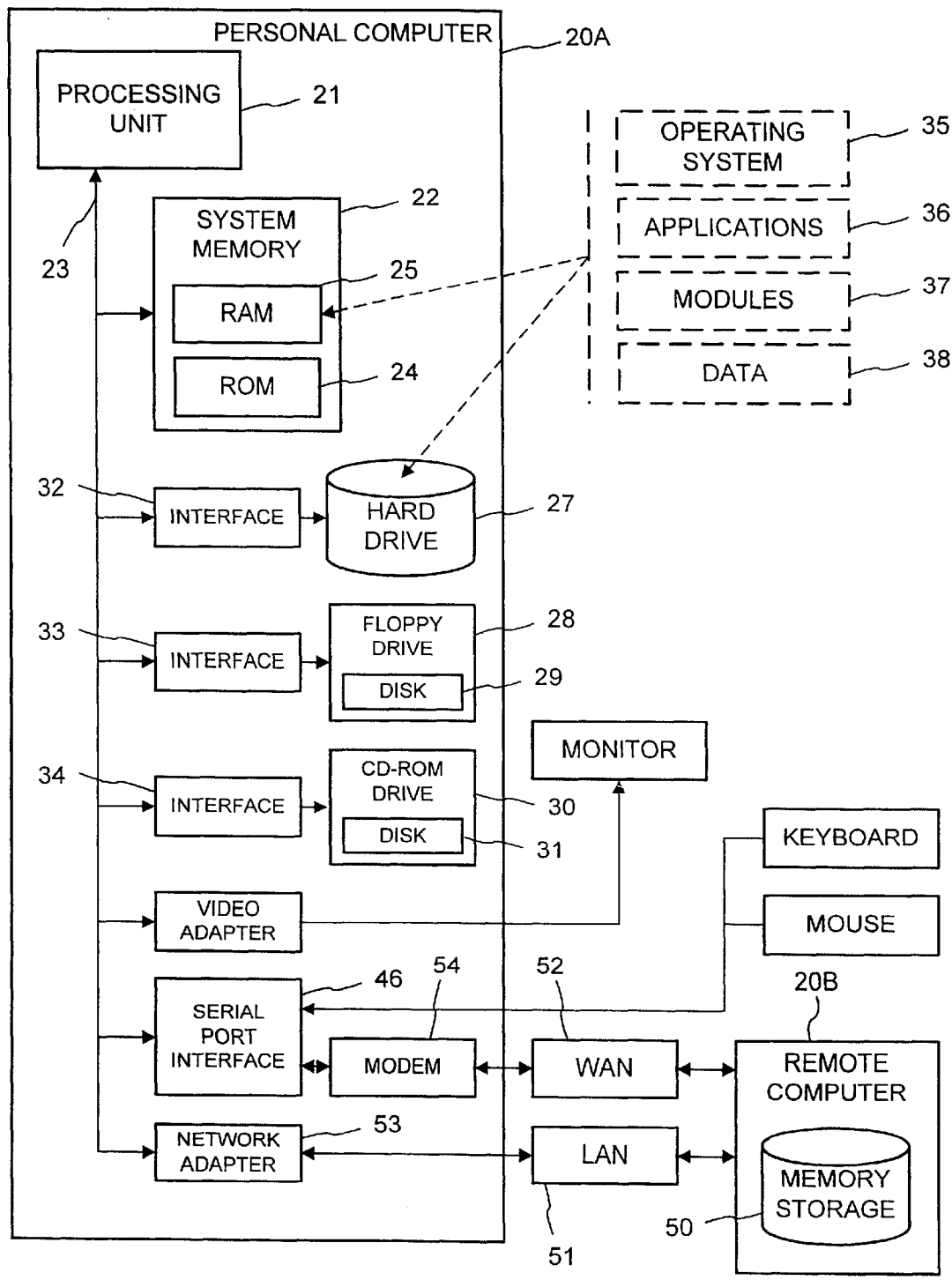
FIG. 1 is a block diagram of an exemplary computer system used in one embodiment of the present invention.

FIG. 1 and the following discussion provide a brief, general description of computers used in an exemplary embodiment. While the embodiment is described in the context of computer-executable instructions of computer programs that run on personal computers, those skilled in the art will recognize that the invention also can be implemented in combination with other program modules. Generally, program modules include routines, programs, components, data structures, etc. that perform particular tasks or implement particular abstract data types. Moreover, those skilled in the art will appreciate that the invention can be practiced with other computer configurations, including hand-held devices, multiprocessor systems, microprocessor-based or programmable consumer electronics, minicomputers, mainframe computers, and the like.

With reference to FIG. 1, the computers 20 used in the illustrated embodiment include a processing unit 21, a system memory 22, and a system bus 23 that couples various system components including the system memory to the processing unit 21. The processing unit can be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus can be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the personal computer 20, such as during start-up, is stored in ROM 24.

Computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment.

A number of program modules can be stored in the drives and RAM 25, including an operating system 35, one or more application programs 36, other program modules 37, and program data 38.

Illustrated computer 20 operates in a networked environment using logical connections to one or more remote computers, such as a remote computer 20B. Remote computer 20B typically includes many or all of the elements described relative to the personal computer 20A, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which can be internal or external, is connected to the system bus 23 via the serial port interface 46. In a networked environment, program modules depicted relative to the personal computer 20, or portions thereof, can be stored in the remote memory storage device. It will be appreciated that the network connections shown are exemplary and other means of establishing a communications link between the computers can be used.

In accordance with the practices of persons skilled in the art of computer programming, the present invention is described below with reference to acts and symbolic representations of operations that are performed by personal computers 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Figure 2:
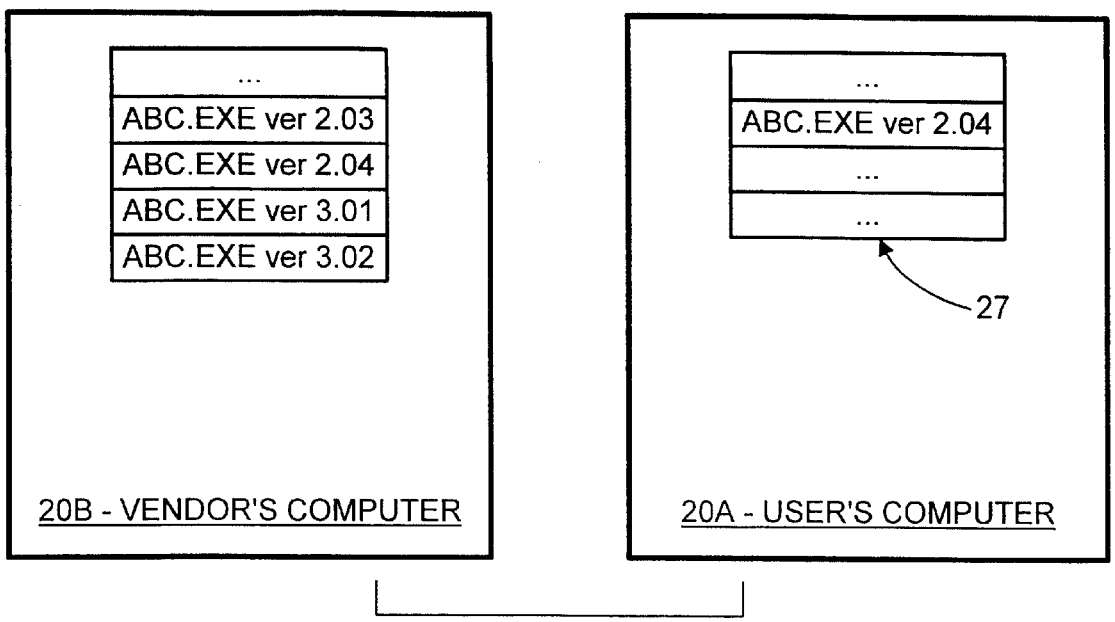
FIG. 2 is a block diagram showing a vendor's computer, a user's computer, and partial hard disk contents of each.

Turning now to FIG. 2, two computers 20A and 20B are shown. Computer 20A is a user's computer. Computer 20B is a software vendor's computer, remote from the user computer. The aim is to produce a patch file on the vendor computer 20B, and transfer it to the user's computer 20A (by diskette, by the internet, etc.) so that an updated file can be produced on the user's computer.

User computer 20A includes a hard disk 27 on which a variety of software files are stored. These include operating system files, application files, and data. Consider particularly an application program that includes several application files, some of which are executable (binary) files. An exemplary executable file may be ABC.EXE.

File ABC.EXE was obtained, sometime earlier, from the software vendor—either on an installation diskette/CD-ROM, or distributed via the internet. It was—at the time of its installation—the most up-to-date version of the file available. A text string indicating the version (e.g. version 2.04) is typically encoded somewhere within the binary file.

When file ABC.EXE was originally installed onto hard disk 27 from the installation disk, some changes may have been made to the file, as discussed below. For the moment, however, assume the file as installed on the hard drive 27 is identical to the file distributed by the software vendor.

Over time, the software vendor has further developed the application program. Successive versions of file ABC.EXE have been written. New purchasers of the program receive from the software vendor the latest version of the file (e.g. version 3.02). However, the user of computer 20A still has version 2.04. The vendor wishes to provide a patch program that will generate, on the user's computer 20A, the latest version of file ABC.EXE.

Figure 3:
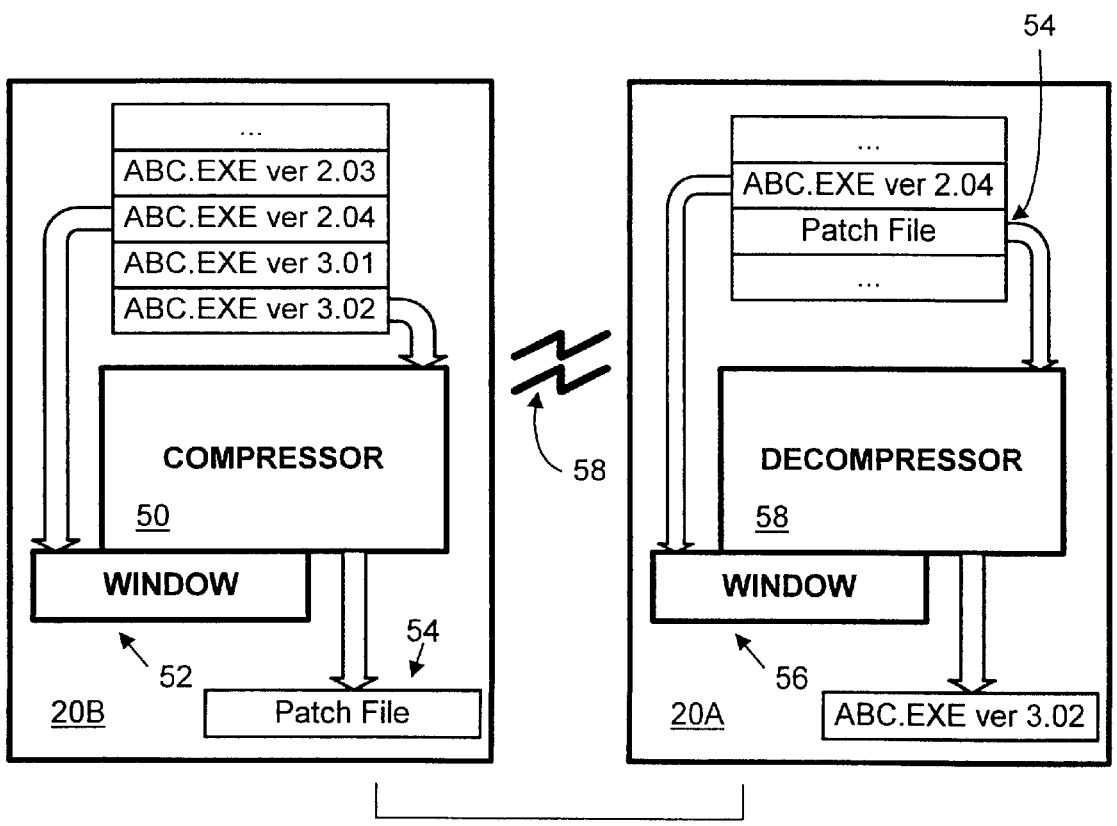
FIG. 3 shows how the vendor's computer of FIG. 2 can be used to generate a patch file, and the user's computer of FIG. 2 can generate an updated file from the patch file, in accordance with one embodiment of the present invention.

The software vendor, naturally, has copies of all prior versions of the application program on its computer 20B. Turning to FIG. 3, to generate a patch file to upgrade version 2.04 of file ABC.EXE to version 3.02, the vendor compresses version 3.02 of file ABC.EXE using an LZ77-type compressor 50 (implemented by suitable programming instructions for computer 20B). However, rather than beginning with an empty compression dictionary 52 (sometimes termed a "history window" or "history buffer" and typically implemented in RAM in computer 20B), the instructions first preload the dictionary with version 2.04 of the file. The compression process proceeds, identifying successive "matches" between versions 3.02 and 2.04 of the file, and encoding same in the compressed output data as "tokens" specifying a particular location in the history window where a match was found, and the length (in bytes, bits, etc.) of the match. Portions of file 3.02 that do not match either any part of version 2.04, or any part of version 3.02 that has already been processed and now is in the dictionary, are encoded in the compressed output data stream as literal characters. The programming then causes the CPU to store the compressed output data from the compression process in a patch file 54. (The patch file may, but need not, include other data, such as self-extraction instructions, etc.) Due to the substantial redundancy between versions 2.04 and 3.02, the patch file is quite small, essentially comprising just the differences between the two files.

Patch file 54 is transferred to the user's computer 20A, by means 58 such as a diskette, CD-ROM, internet, etc., and is typically stored on the user's hard disk 27. A parallel decompression process is then performed on the user's computer. A history window 56, implemented in RAM of computer 20A, is preloaded with version 2.04 of file ABC.EXE as earlier stored on the user's hard disk 27. The compressed data in patch file 54 is then applied to a decompressor 58 (again implemented by appropriate programming of the CPU of computer 20A). Decompression proceeds in accordance with the token and literal information encoded in the compressed data, copying excerpts from the history window 56, and inserting literal characters as appropriate, to regenerate version 3.02 of file ABC.EXE on the user's computer 20A. The regenerated file is then stored on the user's hard disk 27 (not shown).

The history window in the illustrated embodiment is large, such as 8 or 16 megabytes, although smaller sizes can alternatively be used. A large history window usually allows the whole of the older version of file ABC.EXE to be loaded therein. As the newer version of the file is processed during compression (or as the patch file is processed during decompression), the new data can be added to the history window. If the window becomes full, the older version can slide out as it is displaced by data from the newly processed file.

This arrangement is shown in FIGS. 3A and 3B (in a much-abbreviated history window). The older version of the file consists of data ABCDEFGHIJ. The new version of the file consists of data ABCZZDEFGHIJ (the changes being the insertion of additional instructions/code/data "ZZ"). Initially, the entire older version of the file is loaded into the history window. As characters from the new file are processed, they are added to the window to supplement the compression dictionary. Once the window is filled to its capacity, each character added to the window from the new file displaces a character from the old file out of the window.

Figure 4A:
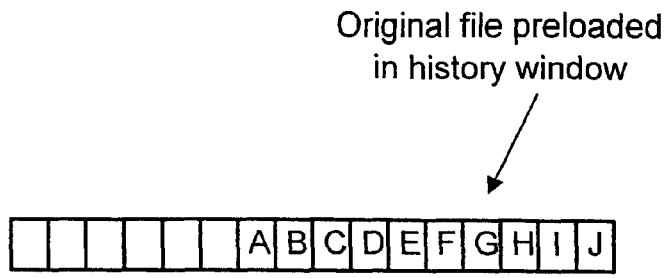
FIGS. 4A and 4B show one way history windows can be managed during the compression and decompression processes shown in FIG. 3.
Figure 4B:
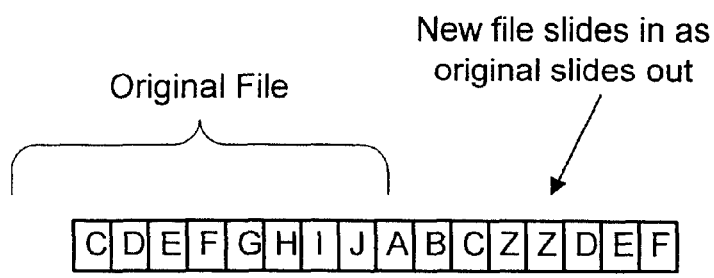
Figure 5A:
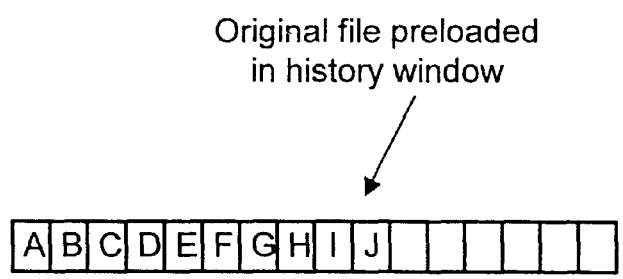
FIGS. 5A and 5B show another way history windows can be managed during the compression and decompression processes shown in FIG. 3.
Figure 5B:
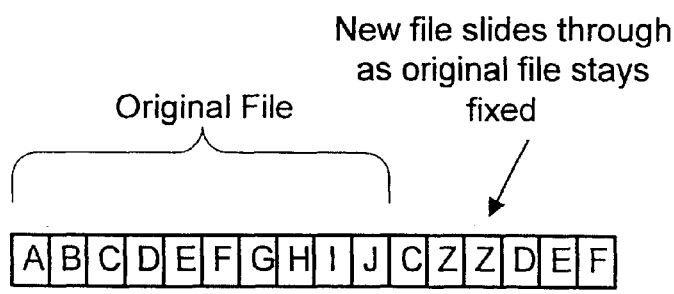

An alternative arrangement is shown in FIGS. 4A and 4B. Again, the older version of the file (ABCDEFGHIJ) is preloaded into the window. As characters from the new file are processed, they are added to the window. Once the window is filled to capacity, the new data slides through the window, with each new character displacing an earlier-processed character. The older version of the file stays in place.

If the history window is not large enough to contain the entire older version of the file, the beginning portion is desirably loaded in the window to the exclusion of the ending portion. (Statistically, it appears that correlation between different versions of the same file is greatest at the beginning, so allocating the history window to the beginning of the file optimizes compression.)

The foregoing assumes prior knowledge of the exact contents of a file on the user's computer 20A. However, as suggested earlier, sometimes a file is modified slightly when it is installed on the user's computer. In such cases, the file on the vendor's computer 20B is different than the file actually resident on the user's computer 20A.

One reason the files may be different is due to binding. Binding is the process by which references external to the file are resolved prior to loading the file for execution. In the installation context, binding is the process of determining the import addresses of other binaries existing on the user's machine, and storing these address in a special area of the file to facilitate faster execution. For example, executable file ABC.EXE may call functions contained in library USER32.DLL. To find these functions, a string search must normally be performed on the file USER32.DLL installed on the user's computer in order to determine the appropriate file offset. Rather than undertaking this process each time file ABC.EXE is executed, the process is performed once—when ABC.EXE is first installed. The applicable offsets are then stored in a table within file ABC.EXE, making this data available for quick reference any time the file is executed.

Another reason the files may be different is due to lock prefix instruction smashing. Executable files are commonly written to run on several different hardware platforms. Instructions specific to one platform may be ignored when the file is run on a different platform. For example, if an executable program is written for both single-processor and multi-processor platforms, the code will likely include "lock-prefix" instructions that synchronize memory accesses when the file is executed on a multi-processor platform. Such instructions, however, are not needed if the code is run on a single-processor platform, and only serve to slow execution.

Due to the performance penalty such superfluous instructions entail, they are commonly "smashed" when the file is installed on a single-processor computer (i.e. replaced by no-operation instructions—NOPs). Doing so speeds execution. However, this again means that the file as installed on the user's computer may not identically match the file as distributed by the software vendor.

Yet another reason a user's files may be different from the vendor's is rebasing. Rebasing is a consequence of the fact that some program files—typically dynamic link libraries—have preferred addresses at which they are expected to be installed in order to make best use of memory. Data inside the file presupposes the file will be installed at the preferred location. If an earlier program has already been loaded at the file's expected address, the file must be loaded elsewhere in memory and all its internal references that depend on a specific load address must be adjusted accordingly. To avoid the performance penalty of performing this relocation in memory each time the file is loaded, the file can be rebased at installation time to an address range that is not used by any other file on the user's computer. When the file is rebased in this way, the internal references are adjusted as necessary so that subsequent loading will not require relocation.

Before the file on the user's computer is patched (whether by the techniques described above, or by prior art techniques), it is desirable to copy the file and "normalize" the copy to a predictable state. So doing assures that the file on the user's computer can be replicated on the vendor's computer, so that appropriate patching instructions can be generated.

Normalizing is essentially a process of removing any differences that would be created as a result of typical installation modifications. Binding, lock prefix removal, and rebasing are some of several such differences that can be normalized.

Figure 6:
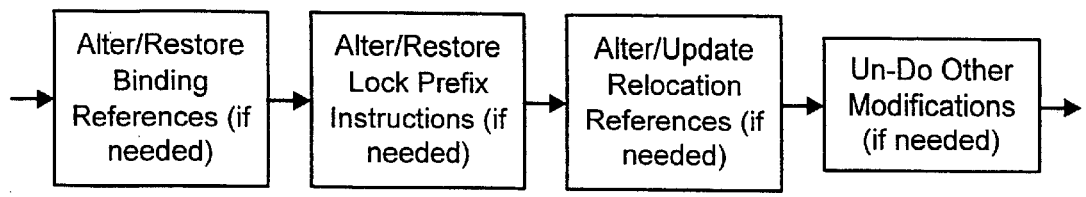
FIG. 6 shows one specific series of operations that can be used to normalize a file prior to patching.

Referring to FIG. 6, a first step in normalizing the file ABC.EXE on the user's computer 20A is to remove any binding-specific information stored in the file. The addresses can be zeroed-out, or changed to any known or predictable or computable value.

A second step is to normalize the smashed "lock prefix" instructions. Since not all "NOP" instructions in the user's file are necessarily smashed lock prefix instructions, NOPs are not all converted to lock prefix instructions. Instead, all lock prefix instructions in the code are uniformly converted to NOPs. (In a single-processor installation, some of the lock prefixes may not have all been smashed. In a multi-processor installation, none of the lock prefixes were earlier smashed.) While this process does not restore the file to its pre-installation form, it converts it to a known form—which is the more important goal.

(Actually, during the build process of an executable file, most linkers automatically create a lock prefix address table that is stored within the executable file. This table is used during installation of the file to determine which instruction locations should be smashed on a single processor computer. The same table can be used in normalizing, allowing the NOPs formed by smashed lock prefix instructions to be identified and restored to their pre-installation form. Again, the aim is simply to convert the file to a known form; the precise form is not critical.)

A third step is to change the rebasing. One option is simply to zero all internal file references in the old file, or change them to any other predictable or computable value. In the preferred embodiment, however, the user's old file is normalized in anticipation of the base address employed in the new file. In particular, the old file on the user's computer is not normalized until the update data is received from the vendor computer. Within the update data (e.g. in a header) is a field specifying the base address used in the new version of the software. If this base address does not match the base address in the user's old file, the normalization process steps through the old file, offsetting each address by the difference between the old file's base address and the new file's base address. In this manner, not only is the user's file brought into a known state, but it is brought into a state that more closely corresponds to the new file, reducing the amount of update data that must be transferred.

Again, the results of such normalizations are not necessarily to restore the file to the state it was in when originally received from the vendor, but to transform a copy of the user's installed file into a file whose characteristics are reliably known. A counterpart such file, on the vendor's machine, can then be used as a basis for determining patching instructions.

Figure 7:
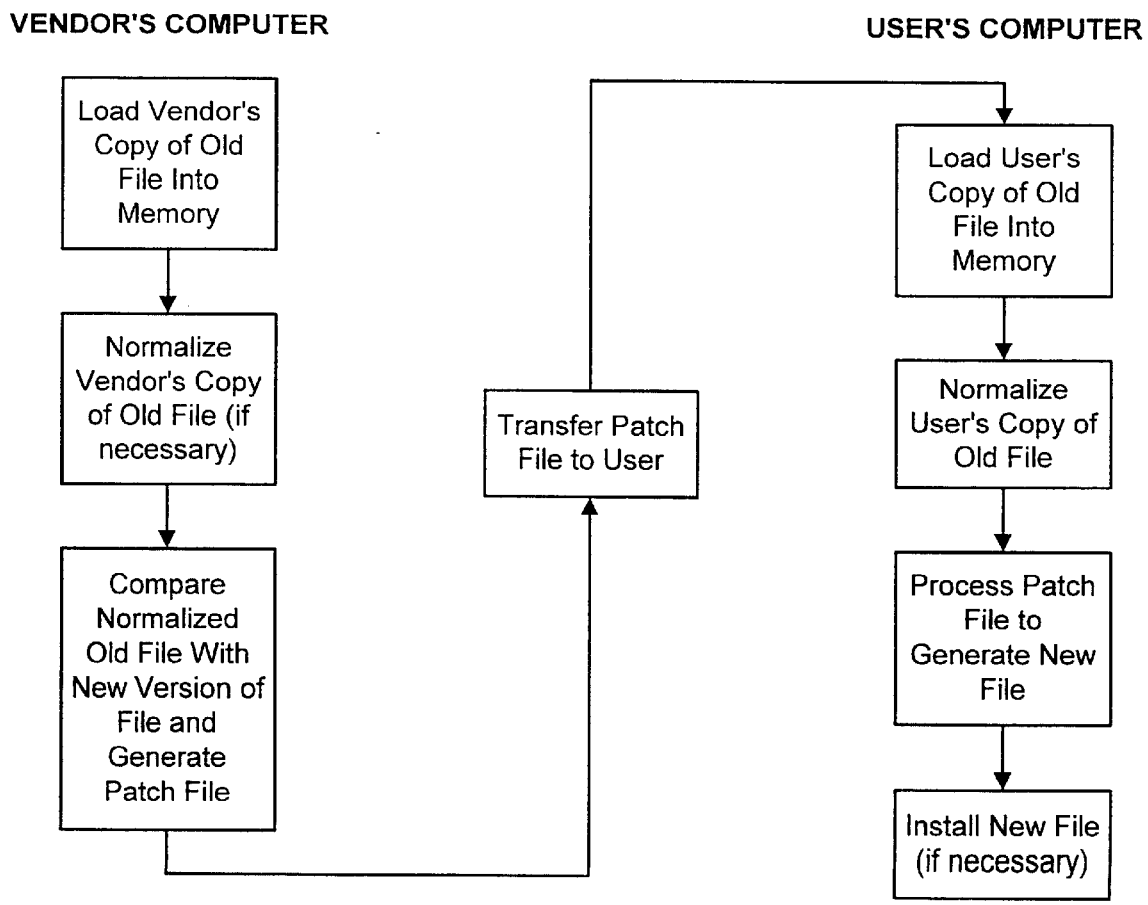
FIG. 7 shows how normalization can be used in the generation, and application, of patch files.

FIG. 7 illustrates the process. On the vendor's computer, the old version of the file is loaded into RAM memory. There it is normalized, as necessary, in accordance with FIG. 6. The normalized file on the vendor's computer is then compared with the new version of the file to generate a patch file. (This "comparing" can be of the type described above, involving LZ compression wherein the history buffer is preloaded with the normalized old file, or it can be done by any other technique.)

The patch file is next transferred to the user's computer. There, the old version of the file is copied from the user's hard disk into RAM memory and normalized, in accordance with FIG. 6. The patch file is then processed to generate—on the user's computer—a copy of the new file. Once the new file has been generated, it can be installed, if necessary. (The installation process may entail various steps in addition to the binding, smashing, etc., operations reviewed above. For example, data from the new file may be entered into registry files maintained by the operating system. For other files, no "installation" process is needed; they are stored on the computer directly as output from the patch processing.)

The normalizing operation can be invoked by instructions stored on the user's computer, in which case the patch file has no additional overhead associated with installation-specific file variations. Alternatively, the normalizing steps to be performed on the file can be specified in a preamble to the patch file received from the vendor. In the latter case, normalization operations specifically tailored to the file being updated can be performed.

From the foregoing, it will be recognized that the preferred embodiment provides much smaller patch files than has been possible with prior art techniques. Smaller patch files mean faster download times for on-line delivery mechanisms, and reduced storage requirements for update diskettes and the like.

The preferred embodiment also eliminates the two-step process at both the vendor and user computers. Instead of (1) comparing files on the vendor computer to generate patching instructions, and then (2) compressing the patching instructions in a separate operation, the detailed embodiment produces a compressed patch file in a single operation. Likewise on the user's computer, instead of (1) decompressing a patch file to obtain patching instructions, and then (2) performing the patching instructions in a separate operation, a single process results in generation of the updated file.

It will also be recognized that the above-described normalizing process allows a single patch file to be distributed for use on plural different computers, even though the file to be updated on each computer is slightly different, due to installation modifications. The creation of multi-version update files (or multiple update files) to try and cope with multiple forms the file may take after installation, is thus obviated.

Having described and illustrated the principles of our invention with reference to an illustrated embodiment, it will be recognized that the embodiment can be modified in arrangement and detail without departing from such principles.

For example, while the invention has been illustrated with reference to software-implemented compression and decompression processes, in alternative embodiments these, and other functions, can be implemented in dedicated hardware.

Similarly, while the invention has been illustrated with reference to a process in which the compressor/decompressor are pre-initialized in accordance with an older version of the same file, in alternative embodiments this need not be the case. Any data known to exist on the user's computer—for which a copy is also available on the vendor's computer—can be used to pre-initialize the compressor/decompressor.

Many executable files, for example, have a high degree of redundancy between each other due to the limited vocabulary of computer instructions. Thus, a vendor who wishes to distribute a brand new application program, having no counterpart code already installed on users' computers, can nonetheless gain substantial compression efficiencies by compressing the program using a compressor pre-initialized with, e.g., a file known to be present on the user's computer. For example, if the application has been written for the Windows NT operating system, the vendor knows that the user's computer will include a large group of known operating system files (e.g. WIN386.EXE, USER.EXE, VBRLN300.DLL, OLE2.DLL, WINFILE.EXE, WINHLP32.EXE, WIN.COM, etc.) in directories \WINDOWS or \WINNT, and \WINDOWS\SYSTEM. Moreover, the operating system software includes a large number of application-like programs, such as Solitaire (SOL.EXE), Write (WRITE.EXE), etc. Depending on the type of code the vendor wishes to distribute, different operating system files can be used to pre-initialize the compressor (and decompressor) to optimize compression.

Naturally, the precise contents of a user's operating system files depend on the particular version and "build" of the operating system that is installed on the user's computer. Accordingly, care must be taken when presuming knowledge about files already available on the user's computer. However, even though operating system files change from one version to the next, much of the code is consistent throughout all versions of an operating system. Such known-stable segments of code—often excerpted from larger files—can be used to pre-initialize the compressor/decompressor.

Particularly in contexts where the user's computer has no older version of the same file being installed, it can be desirable to pre-initialize the compressor/decompressor in accordance with plural files (or file excerpts) from the operating system, rather than just one, reasoning that the larger the source of pre-initialization data, the smaller the resulting patch file. ("Patch file" may suggest that an older version of the file is present and is being updated, but as used herein it also refers to a file that generates a brand new file.)

Generally speaking, if processing a *.EXE file, it is desirable to pre-initialize the compressor/decompressor in accordance with one or more *.EXE files. Similarly, if processing a *.HLP file, other *.HLP files are good choices for pre-initialization. Ditto *.DLL files.

While it has sometimes been suggested to preload the dictionary with a dedicated vocabulary of expected high-frequency character strings (e.g. U.S. Pat. No. 5,652,878, and EP 462,363), the data used to pre-initialize the compressor/decompressor in the illustrative embodiment is different. Such data is not provided on the computers solely as a compression expedient or aid. Rather, such data is present because it is part of an operating system or application program, etc. Its use in this compression context is incidental and secondary to such primary use.

While the invention has been described as employing stand-alone compression and decompression processes, such functionality can be integrated into a more comprehensive set of programs, such as an operating system update utility, or a web-based software installation aplet. It can also be desirable to provide the component parts of the described functionality as operating system services, available through a family of file patching APIs (application programming interfaces).

While the invention has been described in the context of updating a single file, it will be obvious to those skilled in the art that it can advantageously be applied to updating a group of files, such as may be associated with an application program or operating system.

Although the disclosure has focused on core processes, such as generating the update data and generating the updated file using same, it will be recognized that numerous known ancillary processes can be used in conjunction therewith. For example, the raw update data can be assembled into a self-extracting patch file. Execution of such a file on the user's computer can: specify the file to be updated, load that file from the user's hard disk into memory, normalize the file preparatory to updating, implement a software decompressor, pre-initialize the decompressor in accordance with existing data on the user's computer; apply the update data to the decompressor, and take the resulting file data and store it on the user's disk, or initiate any appropriate installation procedure.

While the illustrated LZ77 embodiment has been described as employing a history window of fixed size, those skilled in the art will recognize that the same principles can likewise be applied to systems in which the history window grows.

It will be recognized that the old version of the file may have been installed—sometime earlier—from a distribution media (internet or diskette) by which it was delivered in compressed form. The old version of the file may have thus been decompressed by a decompression process. In that process, data comprising the old version of the file was successively added to the history window. In the weeks or months following this original installation, that decompression code would have been terminated, the memory cleared and applied to other uses, and the file used for its intended purposes. When the user desires to update the file, the old version is restored to a history window, a curious d+e,acu ej avu+ee .

While the invention has been illustrated in the context of providing a newer version of software to a user's computer, there are situations in which it is sometimes necessary to regress and replace a newer version with an older version. The same process can naturally be used, by pre-initializing the compressor/decompressor in accordance with newer version of the software, compressing the older version, etc.

Similarly, while the invention has been described in the context of patching "files," the technology is not so limited. Patching can likewise be applied to any stream of data, such a sequence of network packets, a sequence of key strokes, etc.

The above-described file normalizing processes are not limited to use in the particular embodiment described above. The same techniques can be applied in other, e.g. prior art, software-updating techniques to assure that the file to which the patching instructions are applied is of known content.

Thus, it should be understood that aspects of the above-described technology can be used independently, all together, or in various sub-combinations—as best fits the particular circumstances.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of generating update data on a second computer that can be transferred to a first computer and used to generate a new file thereon, the method comprising:

pre-initializing a compressor on the second computer in accordance with at least a portion of a reference file available on both the first and second computers, said reference file being present on the first computer for a purpose other than serving as a decompression aid; and compressing the new file with said compressor, said compressor thereby generating update data.

2. The method of claim 1 in which the pre-initializing comprises copying said portion of the reference file into a history window associated with the compressor.

3. The method of claim 1 in which the pre-initializing comprises performing a compression operation on said portion of the reference file.

4. The method of claim 1 which includes pre-processing the reference file to normalize same.

5. A storage medium on which update data produced by the process of claim 1 is stored.

6. In a method of using a computer system that includes performing a decompression process on data in an installation file to yield an original file, said decompression process copying decompressed data into a history window implemented in a memory for possible further use, clearing said memory, using the original file, and thereafter upgrading the original file to an upgraded file, an improvement wherein said upgrading includes copying at least a portion of the original file back into the history window, and thereafter decompressing update data using said history window.

7. In a computer system including a processor, a memory, and a storage medium distinct from the memory, the storage medium including an original file stored therein, an improvement comprising means for generating an updated file from the original file by pre-initializing a decompressor on the computer system with the original file, said original file being present on the computer system for a purpose other than serving as a decompression aid.

* * * * *